United States Patent
Ritter et al.

(10) Patent No.: US 7,638,450 B2
(45) Date of Patent: Dec. 29, 2009

(54) LEAD AND ARSENIC FREE OPTICAL LANTHANUM BORATE GLASS

(75) Inventors: Simone Monika Ritter, Mainz (DE); Ute Woelfel, Mainz-Laubenheim (DE); Stefanie Hansen, Gensingen (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/412,673

(22) Filed: Apr. 27, 2006

(65) Prior Publication Data
US 2006/0247119 A1  Nov. 2, 2006

(30) Foreign Application Priority Data
Apr. 29, 2005 (DE) ............... 10 2005 020 423

(51) Int. Cl.
*C03C 3/066* (2006.01)
(52) U.S. Cl. .............. 501/79; 501/51; 501/78; 501/77; 501/49; 501/50
(58) Field of Classification Search .......... 501/78, 501/79
See application file for complete search history.

(56) References Cited

U.S. PATENT DOCUMENTS

| | | | |
|---|---|---|---|
| 4,732,875 | A | 3/1988 | Sagara |
| 6,797,659 | B2* | 9/2004 | Uehara ............ 501/78 |
| 6,818,578 | B2 | 11/2004 | Tachiwama |
| 7,091,145 | B2 | 8/2006 | Wolff et al. |
| 2002/0006857 | A1 | 1/2002 | Tachiwama |
| 2003/0100433 | A1 | 5/2003 | Hayashi et al. |
| 2003/0191008 | A1 | 10/2003 | Uehara |
| 2003/0211929 | A1 | 11/2003 | Hayashi et al. |
| 2004/0023787 | A1 | 2/2004 | Wolff et al. |
| 2004/0145815 | A1* | 7/2004 | Endo ............ 359/642 |
| 2006/0079389 | A1 | 4/2006 | Hayashi |

FOREIGN PATENT DOCUMENTS

| | | |
|---|---|---|
| DE | 2 257 635 | 6/1973 |
| DE | 31 02 690 | 8/1982 |
| DE | 35 34 575 | 4/1986 |
| DE | 36 05 668 | 8/1986 |

(Continued)

OTHER PUBLICATIONS

JP Pub. No. 2003-238198, Nakayama Kazutoshi, Aug. 27, 2003. (Machine Translation).*
Optical Glass, Description of Properties, Germany, 2007 (in English).

*Primary Examiner*—Melvin C Mayes
*Assistant Examiner*—Smita Patel
(74) *Attorney, Agent, or Firm*—Michael J. Striker (57) ABSTRACT

The lead-free, fluorine-free and arsenic-free optical glass, which is useful in mapping, projection, telecommunication, optical communication engineering, and mobile drive and laser technology, has a refractive index of $1.75 \leq n_d \leq 1.83$, an Abbe number of $34 \leq V_d \leq 44$, and $Tg \leq 560°$ C. The glass is free of $WO_3$ and $TeO_2$ and has a composition in percent by weight based on oxide content of: $SiO_2$, 0.5-8; $B_2O_3$, 10-25; ZnO, 10-22; $La_2O_3$, 23-34; $Ta_2O_5$, >15-25; $Nb_2O_5$, 0.5-15; $Al_2O_3$, 0-2; and can include optional ingredients, e.g. alkali and/or alkaline-earth oxides. In addition, a sum of $B_2O_3$ and ZnO is 33 to 41% by weight and preferably a sum of $La_2O_3 + Ta_2O_5 + Nb_2O_5 + Y_2O_3 + ZrO_2$ is greater than 50% by weight.

10 Claims, 2 Drawing Sheets

FOREIGN PATENT DOCUMENTS

| | | |
|---|---|---|
| DE | 101 26 554 | 1/2002 |
| EP | 1 236 694 | 9/2002 |
| FR | 2 841 237 | 12/2003 |
| JP | 56-5345 | 1/1981 |
| JP | 60221338 | 11/1985 |
| JP | 62-100449 | 5/1987 |
| JP | 2002173336 | 6/2002 |
| JP | 2003201142 | 7/2003 |
| JP | 2003238198 | 8/2003 |
| JP | 2003300751 | 10/2003 |

* cited by examiner

Fig. 1

Fig. 2

LEAD AND ARSENIC FREE OPTICAL LANTHANUM BORATE GLASS

CROSS-REFERENCE

The invention described and claimed herein below is also described in German Patent Application 10 2005 020 423.6 filed on Apr. 29, 2005 in Germany. A claim of priority of invention for the invention disclaose herein below under 35 U.S.C. 119 is based on the aforesaid German Patent Application.

BACKGROUND OF THE INVENTION

1. The Field of the Invention

The present invention relates to a lead and arsenic free and preferably gadolinium free and fluorine free optical lanthanum borate glass, to the use of such a glass in the fields of mapping, projection, telecommunication, optical communication engineering, mobile drive and laser technology, as well as to optical elements respectively preforms of such optical elements.

2. Description of Related Art

In the recent years, the tendency on the market in the field of optical technologies as well as opto-electronic technologies (application fields mapping, projection, telecommunication, optical communication engineering, mobile drive and laser technology) goes more and more into the direction of miniaturization. This can be seen with the finished products which become smaller and smaller and naturally requires an increasing miniaturization of the single structural members and components of such finished products. For the producers of optical glasses, this development means a clear decrease of the demanded volumes of rough glass in spite of increasing quantities of finished products. At the same time, there is an increasing pricing pressure from the side of the reprocessors to the producers of glass, since with the production of such smaller components made of block and/or ingot glass noticeably more waste will be produced proportionally based on the product and for the processing of such miniature parts a higher operating expense is necessary than for larger structural members.

Instead of the removing of glass portions for optical components from block or ingot glass which is common till today, therefore recently production procedures become important in which directly after the glass melt preforms respectively pills which are as close as possible to the final contour respectively geometry such as e.g. gobs or spheres may be yielded. For example, the reprocessors' requests for preforms which are close to the final geometry for re-pressing, so-called "precision gobs", are increasing. Normally, these "precision gobs" preferably mean completely fire-polished, free or half-free formed glass portions which are already portioned and have a geometry which is close to the final form of the optical component.

Such "precision gobs" may preferably also be converted into optical elements such as lenses, aspheres etc. by the so-called "precise pressing" or "precise molding" process. Then, a further processing of the geometric form or the surface with e.g. a surface polish is no longer required. This procedure can comply with the smaller volumes of melted glass (distributed on a high number of small parts of material) in a flexible way by shorter set-up times. Because of the relatively lower number of parts per time unit and the normally smaller geometries, the creation of value cannot be caused by the value of the material alone. Rather, the products have to leave the press in a state ready for installation, i.e. laborious post-processing, cooling and/or cold re-processing must not be necessary. Because of the required high accuracy of geometries, precision instruments with high grade and therefore expensive mold materials have to be used for such a pressing procedure. The lifetimes of such molds massively affect the profitability of the products and/or materials produced. A very important factor for a long lifetime of the molds is a working temperature which is as low as possible, but which can only be lowered to a point at which the viscosity of the materials to be pressed is yet sufficient for the pressing procedure. This means, that there is a direct relationship between the processing temperature and therewith the transformation temperature Tg of a glass to be processed and the profitability of such a pressing process: The lower the transformation temperature of the glass, the longer the lifetimes of the molds; and therefore the higher the earnings. Thus, there is a demand for so-called "low-Tg-glasses", i.e. glasses having low melting points and transformation temperatures, i.e. glasses with a viscosity at temperatures which are as low as possible which is sufficient for processing.

Further, from a process technical point of view of the melt there is a growing demand for "short" glasses, i.e. glasses having a viscosity which varies strongly within a certain viscosity range at a relatively small change in temperature. This behaviour has the advantage in the melting process that the times of hot forming, i.e. the closure times of the molds, can be decreased. Because of that, on the one hand the throughput will be increased, i.e. the cycle times will be reduced. On the other hand, because of that also the mold material will be protected which also has a positive effect on the total production costs, as described above. Such "short" glasses have the further advantage that also glasses with higher tendency to crystallization may be processed by the faster cooling than with corresponding longer glasses. Therewith prenucleation which could cause problems in succeeding steps of secondary hot forming will be avoided. This presents the possibility that such glasses may also be stretched to fibres.

Furthermore it is also desirable that, besides the mentioned and the required optical properties, the glasses are sufficiently chemically resistant.

The prior art already describes glasses with similar optical state or with a comparable chemical composition, but these glasses have immense disadvantages. In particular, many of the glasses contain higher proportions of $Gd_2O_3$ which as a rare-earth oxide has a weak band at 590 nm and thus deteriorates the internal transmittance, and/or components which increase the tendency to crystallization, such as e.g. $TiO_2$.

US 2003/0211929 relates to an optical glass for precisely pressed products having a Tg of lower than 630° C. The latter property is achieved by the addition of a very high amount of $B_2O_3$ and ZnO. In every case, the glass contains $Gd_2O_3$ in a proportion of at least 5% by mol.

JP 2003/201142 describes an optical glass for precisely pressed products having also a low Tg. Here also this property is achieved by the addition of a very high amount of $B_2O_3$ and ZnO. In every case, the glass contains $Gd_2O_3$ in a proportion of at least 6% by weight.

US 2003/0191008 comprises an optical glass with a high refractive index for the precise pressing technology. The glass contains very high proportions of $Nb_2O_3$ of at least 30% by weight. $Nb_2O_5$ in such high proportions deteriorates the internal transmittance of the glass.

JP 2003/238198 describes an optical glass for precisely pressed products having a low Tg. The latter property is achieved by the addition of LiF and/or ZnF, wherein in every case fluorine is contained as a component in an amount of at least 9% by weight. Fluorine is disadvantageous with respect to a stable melting and production process, in particular because of the strong evaporation.

JP 2003/300751 describes a low melting glass for precisely pressed products. The low Tg of 480 to 580° C. is i.a. achieved by the addition of $Bi_2O_3$. In every case, $Bi_2O_3$ is contained and imparts self-color to the glass which deteriorates the internal transmittance of the glass.

JP 2002/173336 describes a low melting phosphate glass having a high dispersion respectively low Abbe number of 20 to 32.

DE 35 34 575 relates to a glass for eye glass lenses which in every case comprises a component for coloration. Here, lanthanum oxide is only an optional component.

DE 36 05 668 relates to an optical tellurite glass which in every case comprises toxic tellurium oxide as a component.

DE 101 26 554 describes borosilicate glasses with very high refractive indexes.

The documents EP 1 236 694 A1, US 2003/0100433 and US 2003/0211929 describe optical glasses which are lead and fluorine free, but which in every case contain $Gd_2O_3$.

JP 60-221338 relates to glasses which in every case contain lithium oxide as a component and in which at least a part of one oxide is replaced by fluorine.

SUMMARY OF THE INVENTION

The object of the present invention is, to provide an optical glass with which desired and advantageous optical properties $(n_d/v_d)$ with concurrent low transformation temperatures can be realized, in particular also by virtue of ecological considerations without the use of PbO and $As_2O_3$ and preferably also without the components $Gd_2O_3$ and fluorine. This glasses should further be processible by precise pressing and should be suited for the application fields mapping, projection, telecommunication, optical communication engineering, mobile drive and laser technology, should have a refractive index $n_d$ of $1.75 < n_d \leq 1.85$, an Abbe number $v_d$ of $35 \leq v_d \leq 44$ and preferably a transformation temperature which is as low as possible of $Tg \leq 560°$ C. The meltability and processability of them should also be well, as well as they should have sufficient crystallization stability which makes a production in continuously conducted aggregates possible. A glass within a viscosity range of $10^{7.6}$ to $10^{13}$ dPas which is as "short" as possible is desirable. With a so-called short glass generally a glass is meant which within the viscosity range of $10^2$ to $10^{13}$ dPas has a very steep viscosity curve. For the glasses according to the present invention the term "short" should belong to the viscosity range of $10^{7.6}$ to $10^{13}$ dpas.

The above object is solved by the embodiments of the present invention which are described in the patent claims.

In particular, a lead and arsenic and preferably gadolinium and fluorine free optical glass having a refractive index $n_d$ of $1.75 \leq n_d \leq 1.85$ and an Abbe number $v_d$ of $34 \leq v_d \leq 44$ is provided which comprises the following components (based on oxide in % by weight):

| | |
|---|---|
| $SiO_2$ | 0.5-8 |
| $B_2O_3$ | 10-25 |
| ZnO | 10-26 |
| $La_2O_3$ | 18-34 |
| $Ta_2O_5$ | >15-25 |
| $Nb_2O_5$ | 0.5-15 |
| $WO_3$ | 0-10 |
| $Al_2O_3$ | 0-2 |
| $Li_2O$ | 0-5 |

-continued

| | |
|---|---|
| $Na_2O$ | 0-6 |
| $K_2O$ | 0-8 |
| $Cs_2O$ | 0-9 |
| MgO | 0-5 |
| CaO | 0-5 |
| SrO | 0-5 |
| BaO | 0-5 |
| $Y_2O_3$ | 0-10 |
| $TiO_2$ | 0-6 |
| $ZrO_2$ | 0-11 |
| $HfO_2$ | 0-6 |
| $\Sigma B_2O_3 + ZnO$ | 30-45 |
| $\Sigma$ Alkali metal oxides | 0-10 |
| $\Sigma$ Alkaline-earth metal oxides | 0-8 |
| $\Sigma Al_2O_3, Y_2O_3, WO_3, TiO_2, ZrO_2,$ $HfO_2,$ Alkaline-earth metal oxides | 0-15 |
| Conventional refining agents | 0-2 |

Preferably the sum of the oxides $La_2O_3+Ta_2O_5+Nb_2O_5+Y_2O_3+ZrO_2$ is higher than or equal to 50% by weight based on oxide content.

Preferably the glasses are free of components which are not mentioned,

The glasses according to the present invention have the same optical state, such as the Abbe number and the refractive index, as known optical glasses of similar glass families. However they are featured by good meltability and processability, low production costs due to reduced processing costs, as well as a good environmental compatibility.

In particular, these glasses are suitable for processing close to the final contour, such as e.g. the production of precision gobs, as well as for a blank pressing process (precise pressing) for producing an optical component with accurate final contour. In this context, preferably the viscosity-temperature-profile and the processing temperature of the glasses according to the present invention were adjusted, so that such a hot forming close to the final geometry respectively contour is also possible with sensitive precision apparatuses.

In addition, the combination of crystallization stability and viscosity-temperature-profile of the glasses according to the present invention may make a thermal (further) treatment (pressing respectively re-pressing) of the glasses with nearly no problems possible.

In particular, the glasses according to the present invention have a refractive index $n_d$ of $1.75 \leq n_d \leq 1.85$, preferably of $1.78 \leq n_d \leq 1.83$, especially preferred of 1.80 to 1.81, an Abbe number of $34 \leq V_d \leq 44$, preferably of $36 \leq v_d \leq 43$, preferably of $39 \leq v_d \leq 43$, especially preferably of $40 \leq v_d \leq 42$.

According to an embodiment of the present invention the glasses according to the present invention have a transformation temperature $Tg \leq 560°$ C., preferably $Tg \leq 550°$ C.

According to the present invention a so-called "low-Tg-glass" means a glass with a low transformation temperature Tg, i.e. preferably a Tg of at most 560° C.

Preferably, the glasses according to the present invention are as "short" as possible within a viscosity range of $10^{7.6}$ to $10^{13}$ dPas. In this case "short glasses" mean glasses with a strong variation in the viscosity within a certain viscosity range at a relatively small change of the temperature. Preferably, the temperature interval $\Delta T$ in which the viscosity of this glass falls from $10^{7.6}$ to $10^{13}$ dPas is at most 100° K.

Figure 1:
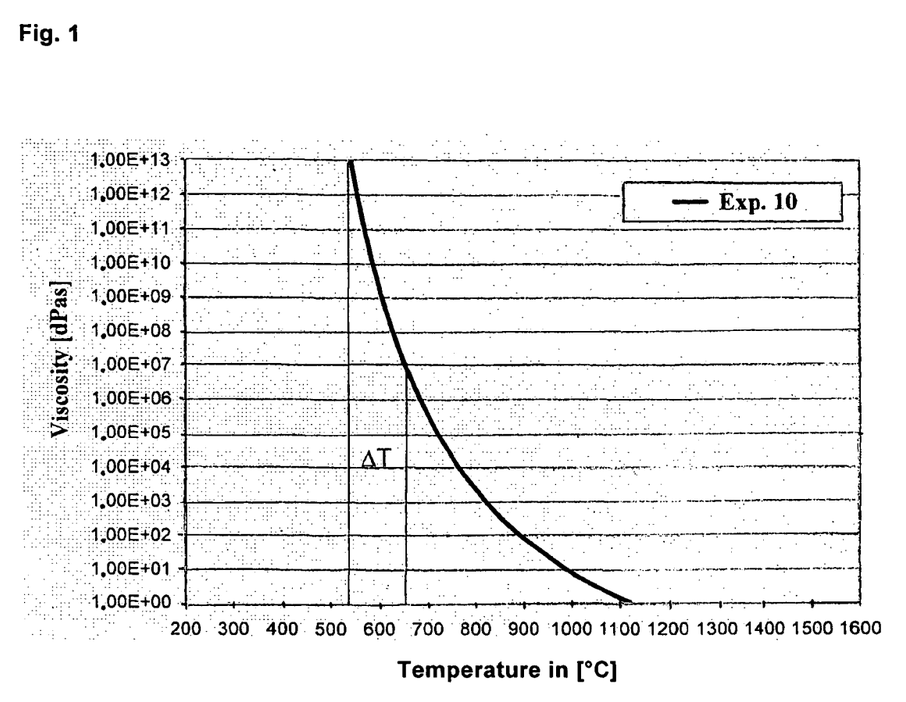

FIG. 1 shows the viscosity curve of a glass according to the present invention according to example 10. In FIG. 1 the vertical lines show the temperature interval $\Delta T$ in which the viscosity of this glass varies from $10^{7.6}$ to $10^{13}$ dPas. Here, $\Delta T$ is between 542 and 637° C., i.e. it is 95° K.

Figure 2:
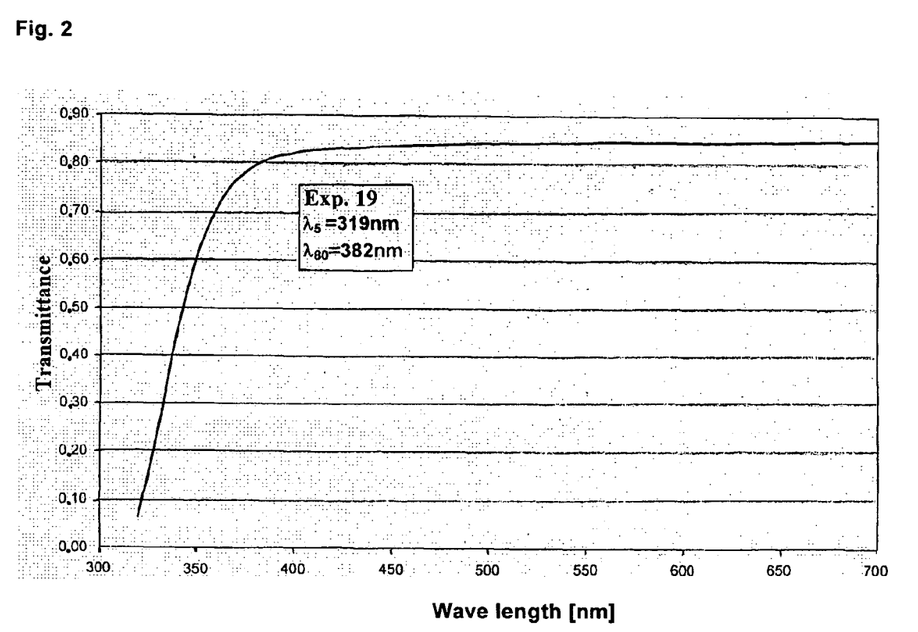

FIG. 2 shows a transmission curve of a glass according to the present invention according to example 19. The wavelengths at which the transmission is 5% and 80% are shown. From those a color code of 38/32 follows.

The "internal quality" according to the present invention means that the glass has a proportion of bubbles and/or streaks and/or similar defects which is as low as possible respectively preferably that it does not at all contain anything like this.

In the following the term "X free" respectively "free of a component X" means that the glass substantially does not contain this component X, i.e. that such a component is present in the glass only as an impurity, but that it is not added to the glass composition as a single component. In this case, X is an arbitrary component, such as for example $Gd_2O_3$.

In the following all data of the proportions of the glass components are in % by weight and based on oxide, unless otherwise stated.

The base glass system of the glass according to the present invention is the lanthanum borate system which has intrinsically a good basis for the desired properties.

The glass according to the present invention has a proportion of ZnO of at least 10% by weight, preferably of at least 12% by weight, especially preferred of at least 14% by weight, as well as a proportion of $B_2O_3$ of also at least 10% by weight, preferably of at least 15% by weight, especially preferably of 17% by weight, and it is therefore a well-melting low-Tg-glass. The proportion of ZnO is at most 26% by weight, preferably at most 24% by weight, especially preferably at most 22% by weight. ZnO contributes to the desired viscosity-temperature-behaviour ("short" glass) in the viscosity range of $10^{7.6}$ to $10^{13}$ dPas.

The maximum proportion of $B_2O_3$ is 25% by weight, preferably at most 24% by weight, especially preferably at most 23% by weight. The strongly network-forming properties of $B_2O_3$ increase the stability of the glasses against crystallization and the chemical resistance. However, the proportion show not exceed 25% by weight, since then the glasses become "longer", which is also not preferable according to the present invention. In addition, during the melting and melting-on process parts of the added $B_2O_3$ may evaporate which makes an accurate adjustment of the composition difficult.

The sum of the proportions of ZnO and $B_2O_3$ is at least 30% by weight, preferably at least 33% by weight, further preferred 34% by weight, especially preferably 38% by weight. A reduction of ZnO and $B_2O_3$ to a content of lower than 30% by weight would lead to glasses which could not be featured by the term "low-Tg-glass". The sum of $B_2O_3$ and ZnO is at most 45% by weight, preferably at most 42% by weight, especially preferred at most 41% by weight. A further increase to above 45% by weight would reduce the refractive index too much. Suited ranges for the sum of ZnO and $B_2O_3$ are 30 to 45% by weight, 34 to 42% by weight, 38 to 41% by weight or 33 to 41% by weight.

Besides $B_2O_3$, $SiO_2$ is contained in these glasses as a network-forming agent in an amount of at least 0.5% by weight, preferably of at least 1% by weight, especially preferred of 2% by weight. The maximum proportion of $SiO_2$ is 8% by weight, preferably 7% by weight, especially preferred 6% by weight. An increase of the proportion of $SiO_2$ to above 8% by weight would result in the increase of the transformation temperature to above 560° C. and to a reduction of the refractive index.

The glass according to the present invention has a proportion of $La_2O_3$ of at least 18% by weight, preferably of at least 20% by weight, preferably of at least 21% by weight, especially preferably of at least 23% by weight. The proportion of $La_2O_3$ is limited to at most 34% by weight, preferably at most 33% by weight, especially preferably at most 32% by weight. The mentioned upper limit of 34% by weight should not be exceeded, because otherwise the viscosity of the glass will be increased too much. The minimum proportion should not fall below 20% by weight, to ensure the high refractive index.

The glass according to the present invention has a proportion of $Ta_2O_5$ of at least >15% by weight, preferably of at least 15.5% by weight. The maximum proportion of $Ta_2O_5$ is 25% by weight, preferably at most 24% by weight, especially preferably at most 20% by weight. The mentioned upper limit of 25% by weight should not be exceeded, since otherwise the glass becomes too expensive and thus it is not economical any longer. The minimum proportion should not fall below >15% by weight, to ensure the high refractive index with a concurrent high Abbe number.

The glass according to the present invention has a proportion of $Nb_2O_5$ of at least 0.5% by weight, preferably of at least 1% by weight, especially preferably of 2% by weight. The maximum proportion of $Nb_2O_5$ is 15% by weight, preferably at most 10% by weight, further preferably at most 8% by weight, especially preferably at most 7% by weight. The given upper limit of 15% by weight should not be exceeded, since $Nb_2O_5$ imparts light self-color to the glass and thus the internal transmittance of the glass will be deteriorated. Furthermore, a higher proportion than 15% by weight of $Nb_2O_5$ results in a too strong decrease of the Abbe number. The minimum proportion should not fall below 0.5% by weight, to ensure the high refractive index.

$WO_3$ may be incorporated into the glass up to a proportion of a maximum of 10% by weight, preferably of 5% by weight. $WO_3$ serves to adjust the refractive index and the Abbe number. The glass can be free of $WO_3$ what is most preferred according to particular embodiments of the invention.

$Y_2O_3$ may be contained in the glass from 0 to a maximum of 10% by weight, preferably up to 9% by weight, especially preferably up to 8% by weight. Like $WO_3$, it serves for adjusting the optical state.

Especially preferred, the glass is free of $TiO_2$ and $HfO_2$. They may be contained in an amount of 0 to a maximum of 6% by weight, preferably up to a maximum of 3% by weight. Both components contribute to high refractive indexes and high dispersions, as well as result in increased Tgs and viscosities of the glass. Furthermore, $TiO_2$ affects the transmission by absorption in UV and the crystallization behaviour in a negative way.

Preferably, the glass according to the present invention is free of $ZrO_2$ but may contain at least 1% by weight, preferably at least 2% by weight. The maximum proportion of $ZrO_2$ is 11% by weight, preferably at most 10% by weight, especially preferably at most 9% by weight. The given upper limit of 11% by weight should not be exceeded, because such high proportions of $ZrO_2$ in the glass result in enhanced devitrification.

The glasses according to the present invention contain $Li_2O$ as alkali metal oxide in a maximum amount of 5% by weight, preferably at most 4% by weight, further preferably 3% by weight. Suited are also amounts are also 2% by weight, 1% by weight or even low amounts such as 0.1% by weight. A suited range is for example 0.1 to 4% by weight. The glass may optionally be free of LiO.

The glass according to the present invention contains at most 6% by weight, preferably at most 5% by weight, especially preferably at most 4% by weight of $Na_2O$.

The glass according to the present invention contains at most 8% by weight, preferably at most 7% by weight, especially preferably at most 6% by weight of $K_2O$.

If the glass contains caesium oxide, it is contained in amounts of at most 9% by weight, preferably of at most 8% by weight and further preferably of at most 7% by weight.

The sum of alkali metal oxides in the glass according to the present invention is 0 to 10% by weight. Preferable are at most 7% by weight, especially preferable are at most 6% by weight. The sum of alkali metal oxides is at most 10% by weight, which value should not be exceeded, since otherwise the refractive index in such a glass system decreases too strong. The addition of the alkali metal oxides serves to optimize the melting-on behaviour, i.e. they act as fluxing agent. In addition, they serve to reduce the Tg.

For a flexible regulation of the viscosity-temperature-behaviour the glass according to the present invention may optionally contain alkaline-earths (MO), which are selected from the group consisting of MgO, CaO, SrO and/or BaO. This sum MO is at most 8% by weight, preferably at most 5% by weight and most preferably at most 4% by weight.

The glass according to the present invention contains at most 2% by weight, preferably at most 1.5 and especially preferably at most 1% by weight of $Al_2O_3$.

The glass according to the present invention as an optical glass is preferably also free of coloring and/or optically active, such as laser active, components.

In particular, the glass according to the present invention is preferably also free of components which are redox-sensitive, such as for example Ag, and/or free of toxic respectively deleterious components, such as for example the oxides of Tl, Te, Be and As. In every case, the glass is free of PbO and arsenic.

According to an embodiment of the present invention, the glass according to the present invention is preferably also free of other components which are not mentioned in the patent claims, i.e. according to such an embodiment, the glass substantially consists of the mentioned components. Here, the term "substantially consisting of" means that other components are present only as impurities, but are not deliberately added to the glass composition as a single component.

The glass according to the present invention may contain conventional fining agents in low amounts. Preferably, the sum of the fining agents added is at most 2.0% by weight, more preferably at most 1.0% by weight. As a fining agent at least one of the following components may be contained in the glass according to the present invention (in % by weight, in addition to the rest of the glass composition):

| | | |
|---|---|---|
| $Sb_2O_3$ | 0-1 | and/or |
| SnO | 0-1 | and/or |
| $SO_4^{2-}$ | 0-1 | and/or |
| $F^-$ | 0-1. | |

Also fluorine and fluorine-containing compounds tend to evaporation during the melting and melting-on process and thus make an accurate adjustment of the glass composition difficult. Therefore, the glass according to the present invention preferably is also free of fluorine.

Further, the present invention relates to the use of the glasses according to the present invention in the application fields mapping, projection, telecommunication, optical communication engineering, mobile drive and laser technology.

Further, the present invention relates to optical elements which comprise the glass according to the present invention. In this case, optical elements in particular may be lenses, aspheres, prisms and compact structural members. In this case, according to the present invention the term "optical element" comprises also preforms of such an optical element, such as for example gobs, precision gobs and the like.

In the following, the present invention is explained in detail by a series of examples. But the present invention is not limited to the mentioned examples.

EXAMPLES

Tables 2 to 5 in example 2 contain embodiment examples within the preferable composition range. The glasses which are described in the examples were prepared as in example 1:

Example 1

The raw materials for the oxides are weighed out, one or more fining agents, such as e.g. $Sb_2O_3$, are added and subsequently they are mixed well. The glass mixture is melted into a continuous melting aggregate at ca. 1150° C., then fined (1200° C.) and homogenized. At a casting temperature of about 1180° C., the glass can be cast and processed to the desired dimensions. Experience has shown that in the continuous aggregate of a high volume, the temperatures can be reduced for at least ca. 100 K and the material can be processed by the pressing method close to the final geometry.

TABLE 1

Melting example for 100 kg of calculated glass (according to example 10)

| Oxide | % by weight | Raw material | Weight (g) |
|---|---|---|---|
| $SiO_2$ | 3.69 | $SiO_2$ | 3686.90 |
| $B_2O_3$ | 20.00 | $H_3BO_3$ | 35469.99 |
| ZnO | 17.20 | ZnO | 17164.71 |
| $Al_2O_3$ | 1.00 | $Al(OH)_3$ | 1547.16 |
| $Li_2O$ | 0.88 | $LiNO_3$ | 4052.58 |
| | 1.00 | $Li_2CO_3$ | 2482.46 |
| $Nb_2O_5$ | 4.21 | $Nb_2O_5$ | 4209.78 |
| $La_2O_3$ | 28.52 | $La_2O_3$ | 28462.62 |
| $Ta_2O_5$ | 16.00 | $Ta_2O_5$ | 15965.33 |
| $Y_2O_3$ | 4.50 | $Y_2O_5$ | 4491.22 |
| $ZrO_2$ | 3.00 | $ZrO_2$ | 2998.04 |
| $Sb_2O_3$ | 0.20 | $Sb_2O_3$ | 200.33 |
| Sum | 100.20 | | 120731.12 |

The properties of the glass thus obtained are given in table 3 as example 10.

Example 2

Tables 2 to 5 comprise the examples 1 to 26 according to the present invention.

All glasses according to the present invention have a Tg of lower than or equal to 560° C., have a very good alkali resistance and can be processed well. The color code of the glasses according to the present invention achieves a value of up to 38/32.

TABLE 2

Examples 1 to 6 (data based on oxide in % by weight, n.d. means "not detected"):

| | Exp. 1 | Exp. 2 | Exp. 3 | Exp. 4 | Exp. 5 | Exp. 6 |
|---|---|---|---|---|---|---|
| $SiO_2$ | 4.79 | 4.79 | 4.99 | 4.69 | 4.69 | 3.69 |
| $B_2O_3$ | 19.89 | 19.89 | 19.89 | 19.89 | 19.89 | 19.89 |
| ZnO | 19.46 | 19.5 | 18.46 | 18.96 | 18.96 | 18.96 |
| $Al_2O_3$ | | | | | | 1.00 |
| $Li_2O$ | 1.88 | 1.88 | 1.88 | 1.88 | 1.88 | 1.88 |
| $Nb_2O_5$ | 1.77 | 2.77 | 3.77 | 2.27 | 3.77 | 3.77 |
| $La_2O_3$ | 28.32 | 28.32 | 28.52 | 28.52 | 28.52 | 28.52 |
| $Ta_2O_5$ | 18.98 | 15.98 | 16.08 | 16.38 | 16.38 | 16.38 |
| $Y_2O_3$ | | | | | | |
| $ZrO_2$ | 4.91 | 6.91 | 6.41 | 7.41 | 5.91 | 5.91 |
| $Sb_2O_3$ | | | | 0.20 | 0.20 | 0.20 |
| Σ | 100.0 | 100.0 | 100.0 | 100.2 | 100.2 | 100.2 |
| $La_2O_3 + ZrO_2 + Nb_2O_5 + Ta_2O_5 + Y_2O_3 + HfO_2$ | 54.0 | 54.0 | 54.8 | 54.6 | 54.6 | 54.6 |
| Σ $R_2O$ (Alkalies) | 1.88 | 1.88 | 1.88 | 1.88 | 1.88 | 1.88 |
| Σ RO (Alkaline-earths) | | | | | | |
| Σ $B_2O_3$, ZnO | 39.35 | 39.35 | 38.35 | 38.85 | 38.85 | 38.85 |
| Σ $Al_2O_3$, $Y_2O_3$, $WO_3$, $TiO_2$, ZrO, $HfO_2$, $R_2O$ | 4.91 | 6.91 | 6.41 | 7.41 | 5.91 | 6.91 |
| Properties | | | | | | |
| $\tau_{i\,(10\,mm,\,400\,nm)}$ | 0.98 | 0.97 | 0.96 | 0.97 | 0.96 | 0.96 |
| $\tau_{i\,(10\,mm,\,500-550\,nm)}$ | >=0.994 | >=0.991 | >=0.994 | >=0.99 | >=0.994 | >=0.993 |
| Color code | 38/31 | 40/31 | 39/31 | 38/31 | 42/32 | 42/31 |
| $n_d$ (7K/h) | 1.80159 | 1.80490 | 1.80790 | 1.80592 | 1.80879 | 1.81066 |
| $v_d$ (7K/h) | 41.54 | 41.24 | 40.80 | 41.35 | 40.68 | 40.56 |
| Pg, F | 0.5651 | 0.5655 | 0.5667 | 0.5654 | 0.5672 | 0.5669 |
| $\Delta P_{g,F}$ | -0.0088 | -0.0089 | -0.0085 | -0.0089 | -0.0082 | -0.0087 |
| $\alpha_{(20-300°\,C.)}\,[10^{-6}/K]$ | 7.09 | 7.12 | 7.09 | 7.12 | 7.07 | 7.10 |
| Tg [° C.] | 533 | 536 | 536 | 540 | 541 | 538 |
| ρ [g/cm³] | 4.59 | 4.55 | 4.5427 | 4.561 | 4.559 | 4.574 |
| $\Delta T = [T(\eta = 10^{7.6}) - T(\eta = 10^{13}\,dPas)]$ | | 94 | | | | |
| SR | 51.0 | 51.3 | | | | |
| AR | 1.2 | 1.0 | | | | |

TABLE 3

Examples 7 to 13 (data based on oxide in % by weight)

| | Exp. 7 | Exp. 8 | Exp. 9 | Exp. 10 | Exp. 11 | Exp. 12 | Exp. 13 |
|---|---|---|---|---|---|---|---|
| $SiO_2$ | 3.69 | 3.69 | 3.70 | 3.69 | 4.19 | 4.69 | 3.69 |
| $B_2O_3$ | 19.89 | 20.00 | 20.00 | 20.00 | 20.00 | 20.00 | 20.00 |
| ZnO | 18.96 | 19.20 | 19.20 | 17.20 | 16.20 | 18.20 | 15.70 |
| $Al_2O_3$ | 1.00 | 1.00 | 1.00 | 1.00 | 1.00 | 1.00 | 1.00 |
| $Li_2O$ | 1.88 | 1.88 | 2.00 | 1.88 | 1.88 | 1.88 | 1.88 |
| $Nb_2O_5$ | 3.77 | 4.21 | 4.50 | 4.21 | 4.21 | 6.21 | 4.21 |
| $La_2O_3$ | 28.52 | 28.52 | 30.60 | 28.52 | 28.52 | 26.52 | 28.52 |
| $Ta_2O_5$ | 16.38 | 16.00 | 16.00 | 16.00 | 16.00 | 16.00 | 16.00 |
| $Y_2O_3$ | 2.00 | 2.50 | 3.00 | 4.50 | 5.00 | 2.50 | 6.00 |
| $ZrO_2$ | 3.91 | 3.00 | — | 3.00 | 3.00 | 3.00 | 3.00 |
| $Sb_2O_3$ | 0.20 | 0.20 | 0.20 | 0.20 | 0.20 | 0.20 | 0.20 |
| Σ | 100.2 | 100.20 | 100.00 | 100.20 | 100.20 | 100.20 | 100.20 |
| $La_2O_3 + ZrO_2 + Nb_2O_5 + Ta_2O_5 + Y_2O_3 + HfO_2$ | 54.6 | 54.2 | 54.1 | 56.2 | 56.7 | 54.2 | 57.7 |
| Σ $R_2O$ (Alkalies) | 1.88 | 1.88 | 2.00 | 1.88 | 1.88 | 1.88 | 1.88 |
| Σ RO (Alkaline-earths) | | | | | | | |
| Σ $B_2O_3$, ZnO | 38.85 | 39.20 | 39.20 | 37.20 | 36.20 | 38.20 | 35.70 |
| Σ $Al_2O_3$, $Y_2O_3$, $WO_3$, $TiO_2$, $HfO_2$, $R_2O$ | 6.91 | 6.50 | 4.00 | 8.50 | 9.00 | 6.50 | 10.00 |
| Properties | | | | | | | |
| $\tau_{i\,(10\,mm,\,400\,nm)}$ | 0.96 | 0.96 | 0.95 | 0.96 | 0.95 | 0.96 | 0.96 |
| $\tau_{i\,(10\,mm,\,500-550\,nm)}$ | >=0.992 | >=0.995 | >=0.987 | 0.995 | 0.98 | >=0.985 | >=0.98 |
| Color code | 42/31 | 38/32 | 42/31 | 42/31 | 42/31 | 42/31 | 42/31 |
| $n_d$ (7K/h) | 1.80663 | 1.80517 | 1.80109 | 1.80774 | 1.80563 | 1.80472 | 1.80835 |

TABLE 3-continued

Examples 7 to 13 (data based on oxide in % by weight)

| | Exp. | | | | | | |
|---|---|---|---|---|---|---|---|
| | 7 | 8 | 9 | 10 | 11 | 12 | 13 |
| $v_d$ (7K/h) | 41.02 | 41.04 | 41.47 | 41.21 | 41.40 | 40.15 | 41.39 |
| Pg, F | 0.5665 | 0.5667 | 0.5665 | 0.5662 | 0.5665 | 0.5687 | 0.5658 |
| $\Delta P_{g,F}$ | −0.0083 | −0.0081 | −0.0075 | −0.0083 | −0.0077 | −0.0075 | −0.0084 |
| $\alpha_{(20\text{-}300°\,C.)}\,[10^{-6}/K]$ | 7.25 | 7.27 | 7.48 | 7.33 | 7.30 | 7.06 | 7.42 |
| Tg [° C.] | 533 | 532 | 529 | 544 | 545 | 540 | 546 |
| ρ [g/cm³] | 4.57 | 4.56 | 4.57 | 4.5659 | 4.5452 | 4.4827 | 4.560 |
| $\Delta T = [T(\eta = 10^{7.6}) - T(\eta = 10^{13}\,dPas)]$ | | 93 | | 95 | | 96 | |
| SR | | | | | | 51.3 | |
| AR | | | | | | 1.0 | |

TABLE 4

Examples 14 to 20 (data based on oxide in % by weight)

| | Exp. | | | | | | |
|---|---|---|---|---|---|---|---|
| | 14 | 15 | 16 | 17 | 18 | 19 | 20 |
| $SiO_2$ | 3.69 | 3.69 | 3.69 | 3.19 | 3.69 | 3.40 | 3.57 |
| $B_2O_3$ | 20.00 | 20.00 | 20.00 | 20.00 | 20.00 | 18.80 | 20.00 |
| ZnO | 16.20 | 14.70 | 14.70 | 16.20 | 17.20 | 18.40 | 19.10 |
| $Al_2O_3$ | 0.50 | 0.50 | 0.30 | 1.00 | 1.00 | 1.08 | 1.02 |
| $Li_2O$ | 1.88 | 1.88 | 2.08 | 1.88 | 1.88 | 1.79 | 1.65 |
| $Nb_2O_5$ | 4.21 | 4.21 | 4.21 | 4.21 | 4.21 | 4.06 | 14.50 |
| $La_2O_3$ | 28.52 | 28.52 | 28.52 | 28.52 | 28.52 | 31.60 | 18.70 |
| $Ta_2O_5$ | 16.00 | 16.00 | 16.00 | 16.00 | 18.00 | 15.60 | 15.80 |
| $Y_2O_3$ | 6.00 | 7.50 | 7.50 | 6.00 | 2.50 | 2.40 | 2.47 |
| $ZrO_2$ | 3.00 | 3.00 | 3.00 | 3.00 | 3.00 | 2.90 | 2.97 |
| $Sb_2O_3$ | 0.20 | 0.20 | 0.20 | 0.20 | 0.20 | 0.17 | 0.17 |
| Σ | 100.2 | 100.2 | 100.2 | 100.2 | 100.2 | 100.2 | 100 |
| $La_2O_3 + ZrO_2 + Nb_2O_5 + Ta_2O_5 + Y_2O_3 + HfO_2$ | 57.7 | 59.2 | 59.2 | 57.7 | 56.2 | 56.6 | 54.4 |
| Σ $R_2O$ (Alkalies) | 1.88 | 1.88 | 2.08 | 1.88 | 1.88 | 1.79 | 1.65 |
| Σ RO (Alkaline-earths) | — | — | — | — | — | — | — |
| Σ $B_2O_3$, ZnO | 36.20 | 34.70 | 34.70 | 36.20 | 37.20 | 37.20 | 39.10 |
| Σ $Al_2O_3$, $Y_2O_3$, $WO_3$, $TiO_2$, ZrO, $HfO_2$, $R_2O$ | 9.50 | 11.00 | 10.80 | 10.00 | 6.50 | 6.38 | 6.46 |
| Properties | | | | | | | |
| $T_{i\,(10\,mm,\,400\,nm)}$ | 0.96 | 0.96 | n.d. | 0.96 | n.d. | 0.98 | 85 |
| $T_{i\,(10\,mm,\,500\text{-}550\,nm)}$ | >=0.99 | >=0.98 | n.d. | >=0.99 | n.d. | >=0.995 | >=92 |
| Color code | 42/31 | 42/31 | n.d. | 42/31 | n.d. | 38/32 | 48/33 |
| $n_d$ (7K/h) | 1.81043 | 1.81213 | 1.81153 | 1.80894 | 1.81066 | 1.81138 | 1.82953 |
| $v_d$ (7K/h) | 41.29 | 41.41 | 41.43 | 40.69 | 40.12 | 41.22 | 35.42 |
| Pg, F | 0.5662 | 0.566 | 0.5657 | 0.5674 | 0.5682 | 0.5674 | 0.5795 |
| $\Delta P_{g,F}$ | −0.0082 | −0.0082 | −0.0084 | −0.008 | −0.0082 | −0.0070 | −0.0048 |
| $\alpha_{(20\text{-}300°\,C.)}\,[10^{-6}/K]$ | 7.44 | 7.49 | 7.62 | 7.23 | 7.11 | 7.44 | 6.66 |
| Tg [° C.] | 543 | 546 | 543 | 540 | 536 | 540 | 534 |
| ρ [g/cm³] | 4.5797 | 4.5795 | 4.5765 | 4.5831 | 4.6054 | 4.39970 | 4.3997 |
| $\Delta T = [T(\eta = 10^{7.6}) - T(\eta = 10^{13}\,dPas)]$ | | | | | | | |
| SR | | 51.2 | | | | 51.2 | |
| AR | | 1.0 | | | | 1.0 | |

TABLE 5

Examples 21 to 26 (data based on oxide in % by weight)

| | Exp. | | | | | |
|---|---|---|---|---|---|---|
| | 21 | 22 | 23 | 24 | 25 | 26 |
| $SiO_2$ | 3.60 | 3.45 | 1.91 | 3.70 | 3.79 | 3.70 |
| $B_2O_3$ | 19.53 | 18.69 | 21.28 | 20.05 | 20.54 | 20.08 |
| $Al_2O_3$ | 0.98 | 0.94 | | | | 0.15 |
| $Li_2O$ | | | 1.90 | 1.89 | 1.93 | 1.39 |
| $Na_2O$ | 3.81 | | | | | 0.52 |
| $K_2O$ | | 5.54 | | | | 0.79 |

TABLE 5-continued

Examples 21 to 26 (data based on oxide in % by weight)

| | Exp. | | | | | |
|---|---|---|---|---|---|---|
| | 21 | 22 | 23 | 24 | 25 | 26 |
| $Cs_2O$ | | | 2.24 | | | |
| $Nb_2O_5$ | 4.11 | 3.93 | 8.23 | 4.22 | 2.05 | 4.22 |
| $La_2O_3$ | 27.95 | 24.12 | 22.02 | 28.60 | 29.29 | 28.64 |
| $Ta_2O_5$ | 15.67 | 21.84 | 23.67 | 16.04 | 16.43 | 16.06 |
| $Y_2O_3$ | 2.45 | | | 2.51 | 0.64 | 2.51 |
| $HfO_2$ | | 0.54 | | | | |
| MgO | | | 1.12 | | | |
| CaO | | | | 0.55 | 0.57 | |
| SrO | | | | | 1.78 | |
| BaO | | | | | | |
| ZnO | 18.76 | 17.94 | 15.07 | 19.24 | 19.71 | 19.28 |
| $ZrO_2$ | 2.93 | 2.80 | 2.38 | 3.00 | 3.08 | 1.47 |
| $TiO_2$ | | | | | | 1.00 |
| $Sb_2O_3$ | 0.20 | 0.20 | 0.20 | 0.20 | 0.20 | 0.20 |
| $\Sigma$ | 100.0 | 100.0 | 100.0 | 100.0 | 100.0 | 100.0 |
| $La_2O_3 + ZrO_2 + Nb_2O_5 + Ta_2O_5 + Y_2O_3 + HfO_2$ | 53.1 | 53.2 | 56.3 | 54.4 | 51.5 | 52.9 |
| $\Sigma R_2O$ (Alkalies) | 3.8 | 5.5 | 4.1 | 1.9 | 1.9 | 2.7 |
| $\Sigma$ RO (Alkaline-earths) | 0.0 | 0.0 | 1.1 | 0.5 | 2.3 | 0.0 |
| $\Sigma B_2O_3$, ZnO | 38.3 | 36.6 | 36.3 | 39.3 | 40.2 | 39.4 |
| $\Sigma Al_2O_3, Y_2O_3, WO_3, TiO_2, ZrO, HfO_2, R_2O$ | 10.2 | 9.8 | 6.5 | 7.4 | 5.6 | 7.8 |
| Properties | | | | | | |
| $T_{i\,(10\,mm,\,400\,nm)}$ | 0.96 | | 0.64 | | 0.88 | 0.95 |
| $T_{i\,(10\,mm,\,500\text{-}550\,nm)}$ | 0.992 | | 0.729 | | 0.922 | 0.99 |
| Color code | 38/31 | | 44/34 | | 37/31 | 39/33 |
| $n_d$ (7K/h) | 1.78203 | 1.76629 | 1.81504 | 1.80842 | 1.79501 | 1.80156 |
| $v_d$ (7K/h) | 40.61 | 39.10 | 37.06 | 40.97 | 42.36 | 39.97 |
| $P_{gF}$ | 0.5674 | 0.5704 | 0.5751 | 0.5669 | 0.5642 | 0.5698 |
| $\Delta P_{gf}$ | -0.0081 | -0.0077 | -0.0064 | -0.0080 | -0.0083 | -0.0068 |
| $\alpha_{(20\text{-}300°\,C.)}\,[10^{-6}/K]$ | 7.68 | 7.43 | 6.95 | 7.4 | 7.6 | 7.45 |
| Tg [° C.] | 545 | 548 | 522 | 526 | 531 | 524 |
| $\rho$ [g/cm$^3$] | 4.4613 | 4.3805 | 4.5341 | 4.5773 | 4.5590 | 4.5170 |
| $\Delta T = (T(\log\eta = 10^{7.6}) - T(\log\eta 10^{13}))$ [K] | | | | 93 | 94 | 98 |
| SR [class] (ISO 8424) | | | | | | |
| AR [class] (ISO 10629) | | | | | | |

The invention claimed is:

1. A lead-free, fluorine-free and arsenic-free optical glass having a refractive index $n_d$ of $1.75 \leq n_d \leq 1.83$ and an Abbe number $v_d$ of $34 \leq v_d \leq 44$, said glass comprising, in percent by weight based on oxide content:

| | |
|---|---|
| $SiO_2$ | 0.5-8 |
| $B_2O_3$ | 10-25 |
| ZnO | 16.2-22 |
| $La_2O_3$ | 23-34 |
| $Ta_2O_5$ | >15-25 |
| $Nb_2O_5$ | 0.5-15 |
| $Al_2O_3$ | 0-2 |
| $Li_2O$ | 0-5 |
| $Na_2O$ | 0-6 |
| $K_2O$ | 0-8 |
| $Cs_2O$ | 0-9 |
| MgO | 0-5 |
| CaO | 0-5 |
| SrO | 0-5 |
| BaO | 0-5 |
| $Y_2O_3$ | 0-10 |
| $TiO_2$ | 0-6 |
| $ZrO_2$ | 0-11 |
| $HfO_2$ | 0-6 |
| $\Sigma B_2O_3$, ZnO | 33-41 |
| $\Sigma$ Alkali metal oxides | 1.65-10 |

-continued

| | |
|---|---|
| $\Sigma$ Alkaline-earth metal oxides | 0-8 |
| $\Sigma Al_2O_3, Y_2O_3, TiO_2, ZrO_2,$ $HfO_2$, Alkaline-earth metal oxides | 0-15 |
| at least one refining agents | 0-2; | wherein said glass is free of $WO_3$, said glass is free of $TeO_2$, said glass is free of lead, said glass is free of fluorine, and said glass is free of arsenic; and having a transformation temperature Tg that is at most 560° C. and a viscosity that decreases from $10^{7.6}$ to $10^{13}$ dPas when a temperature decrease of at most 100° K. occurs.

2. The optical glass as defined in claim 1, containing from 0.1 to 4 percent by weight of said $Li_2O$, from 1.65 to 10 percent by weight of said ΣAlkali oxides, and from 0 to 1 percent by weight of said at least one refining agent.

3. The optical glass as defined in claim 1, wherein a sum of $La_2O_3+Ta_2O_5+Nb_2O_5+Y_2O_3+ZrO_2$ is greater than 50 percent by weight.

4. A lead-free, fluorine-free and arsenic-free optical glass having a refractive index $n_d$ of $1.75 \leq n_d 1.83$ and an Abbe number $v_d$ of $34 \leq v_d 44$, said glass comprising, in percent by weight based on oxide content:

| | |
|---|---|
| SiO$_2$ | 1-7 |
| B$_2$O$_3$ | 15-24 |
| ZnO | 16.2-22 |
| La$_2$O$_3$ | 23-33 |
| Ta$_2$O$_5$ | 15.5-23 |
| Nb$_2$O$_5$ | 1-8 |
| Al$_2$O$_3$ | 0-1.5 |
| Li$_2$O | 0.1-4 |
| Na$_2$O | 0-5 |
| K$_2$O | 0-6 |
| Cs$_2$O | 0-8 |
| MgO | 0-4 |
| CaO | 0-4 |
| SrO | 0-4 |
| BaO | 0-4 |
| Y$_2$O$_3$ | 0-9 |
| TiO$_2$ | 0-3 |
| ZrO$_2$ | 1-10 |
| HfO$_2$ | 0-3 |
| Σ B$_2$O$_3$, ZnO | 34-41 |
| Σ Alkali metal oxides | 1.65-7 |
| Σ Alkaline-earth metal oxides | 0-5 |
| Σ Al$_2$O$_3$, Y$_2$O$_3$, TiO$_2$, ZrO$_2$, HfO$_2$, Alkaline-earth metal oxides | 0-13 |
| at least one refining agents | 0-2; | and containing more than 50 percent by weight of a sum of La$_2$O$_3$+Ta$_2$O$_5$+Nb$_2$O$_5$+Y$_2$O$_3$+ZrO$_2$;

wherein said glass is free of WO$_3$, said glass is free of TeO$_2$, said glass is free of lead, said glass is free of fluorine, and said glass is free of arsenic; and having a transformation temperature Tg that is at most 560° C. and a viscosity that decreases from $10^{7.6}$ to $10^{13}$ dPas when a temperature decrease of at most 100° K. occurs.

5. A lead-free, fluorine-free and arsenic-free optical glass having a refractive index n$_d$ of $1.75 \leq n_d \leq 1.83$ and an Abbe number v$_d$ of $34 \leq v_d \leq 44$, said glass comprising, in percent by weight based on oxide content:

| | |
|---|---|
| SiO$_2$ | 1-7 |
| B$_2$O$_3$ | 15-23 |
| ZnO | 16.2-22 |
| La$_2$O$_3$ | 23-33 |
| Ta$_2$O$_5$ | 15.5-23 |
| Nb$_2$O$_5$ | 1-8 |
| Al$_2$O$_3$ | 0-1.5 |
| Li$_2$O | 0.5-4 |
| Na$_2$O | 0-4 |
| K$_2$O | 0-4 |
| Cs$_2$O | 0-4 |
| MgO | 0-4 |
| CaO | 0-4 |
| SrO | 0-4 |
| BaO | 0-4 |
| Y$_2$O$_3$ | 0-9 |
| TiO$_2$ | 0-3 |
| ZrO$_2$ | 1-10 |
| HfO$_2$ | 0-3 |
| Σ B$_2$O$_3$, ZnO | 38-41 |
| Σ Alkali metal oxides | 1.65-6 |
| Σ Alkaline-earth metal oxides | 0-4 |
| Σ Al$_2$O$_3$, Y$_2$O$_3$, TiO$_2$, ZrO$_2$, HfO$_2$, Alkaline-earth metal oxides | 0-13 |
| at least one refining agents | 0-2; | and containing more than 50 percent by weight of a sum of La$_2$O$_3$+Ta$_2$O$_5$+Nb$_2$O$_5$+Y$_2$O$_3$+ZrO$_2$;

wherein said glass is free of fluorine, said glass is free of TeO$_2$, said glass is free of WO$_3$, said glass is free of lead, and said glass is free of arsenic; and having a transformation temperature Tg that is at most 560° C. and a viscosity that decreases from $10^{7.6}$ to $10^{13}$ dPas when a temperature decrease of at most 100° K. occurs.

6. The optical glass as defined in claim 1, containing up to one percent by weight of said at least one refining agent, and wherein said at least one refining agent is selected from the group consisting of Sb$_2$O$_3$, SnO, SO$_4^{2-}$ and F.

7. The optical glass as defined in claim 1, which is free of gadolinium.

8. An optical element comprising an optical glass according to any one of claims 1 to 7, said optical element consisting of a lens, asphere, a prism, or a compact structural member for use in the field of mapping, projection, telecommunication, optical communication engineering, mobile drive, or laser technology.

9. An optical element comprising an optical glass according to any one of claims 1 to 7.

10. A method of making an optical element, comprising the step of precise pressing an optical glass according to any one of claims 1 to 7.

* * * * *